(12) United States Patent
Li et al.

(10) Patent No.: US 10,530,199 B2
(45) Date of Patent: Jan. 7, 2020

(54) SINGLE PHASE PERMANENT MAGNET MOTOR AND STATOR CORE THEREOF

(71) Applicant: JOHNSON ELECTRIC INTERNATIONAL AG, Murten (CH)

(72) Inventors: Yue Li, Hong Kong (CN); Chui You Zhou, Shenzhen (CN); Yong Wang, Shenzhen (CN); Yong Li, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 181 days.

(21) Appl. No.: 15/254,424

(22) Filed: Sep. 1, 2016

(65) Prior Publication Data

US 2017/0063177 A1 Mar. 2, 2017

(30) Foreign Application Priority Data

Sep. 1, 2015 (CN) .......................... 2015 1 0552072

(51) Int. Cl.
*H02K 1/14* (2006.01)
*H02K 1/27* (2006.01)
*H02K 3/18* (2006.01)

(52) U.S. Cl.
CPC ........... *H02K 1/141* (2013.01); *H02K 1/2706* (2013.01); *H02K 3/18* (2013.01)

(58) Field of Classification Search
CPC .......... H02K 19/04; H02K 1/14; H02K 1/143; H02K 21/185
See application file for complete search history.

(56) References Cited

U.S. PATENT DOCUMENTS

| | | | | | |
|---|---|---|---|---|---|
| 4,048,548 A | * | 9/1977 | Nakajima | ............... | G04C 13/11 310/162 |
| 4,095,130 A | * | 6/1978 | Oshima | .................... | G04C 3/16 310/156.45 |
| 4,162,418 A | * | 7/1979 | Kawaki | .................. | H02K 37/16 310/163 |
| 4,214,181 A | * | 7/1980 | Nagahori | ............. | H02K 21/185 310/156.08 |
| 4,361,772 A | * | 11/1982 | Fukushima | ............ | H02K 37/16 310/162 |
| 5,927,249 A | * | 7/1999 | Ackermann | ............ | F02D 11/10 123/399 |
| 6,548,922 B1 | * | 4/2003 | Takahashi | ............... | G04C 13/11 310/49.33 |

\* cited by examiner

*Primary Examiner* — Dang D Le
(74) *Attorney, Agent, or Firm* — Muncy, Geissler, Olds & Lowe, P.C.

(57) ABSTRACT

A single phase permanent magnet motor includes a stator core, windings, and a permanent magnet rotor. The stator core includes an end portion and two spaced arm portions each including a connecting arm and a pole claw. Each pole claw has a long pole tip and a short pole tip, and forms a pole surface. The long pole tip of each pole claw corresponds to the short pole tip of the other pole claw with a slot opening formed there between. The slot opening causes the arc pole surface to be discontinued along a circumferential direction, and the arc pole surface is recessed inwardly to form a startup groove.

16 Claims, 3 Drawing Sheets

SINGLE PHASE PERMANENT MAGNET MOTOR AND STATOR CORE THEREOF

CROSS REFERENCE TO RELATED APPLICATIONS

This non-provisional patent application claims priority under 35 U.S.C. § 119(a) from Patent Application No. 201510552072.1 filed in The People's Republic of China on 1 Sep. 2015.

FIELD OF THE INVENTION

The present invention relates to single phase motors, and in particular to a stator core of a single phase permanent magnet motor.

BACKGROUND OF THE INVENTION

A single phase permanent magnet motor usually consists of a stator core, stator windings, and a permanent magnet rotor. The stator core is generally U-shaped, including two spaced pole arms. A pole claw is formed at a distal end of each pole arm. An inner wall surface of each pole claw is inwardly recessed to form an arc pole surface. The windings are wound around the pole arms. The rotor is disposed between the two pole claws and confronts the arc pole surface with a generally even air gap formed there between.

For facilitating startup of the rotor, the arc pole surface is inwardly recessed to form a startup groove. The startup groove is offset from a central axis of the pole claw, such that when the rotor stops rotation after power off, a pole axis of the rotor is offset from the central axis of the pole claw by an angle to form a startup angle. Under the driving of a corresponding startup circuit, the rotor can be successfully started along a required direction when the motor is energized. However, the above single phase permanent magnet is incapable of conditions requiring bidirectional startup, which limits its application.

SUMMARY OF THE INVENTION

Thus, there is a desire for a single phase permanent magnet motor capable of bidirectional startup and a stator core of such a motor.

In one aspect, the present invention provides a stator core comprising: an end portion; and two spaced arm portions extending from the end portion. Each arm portion includes a connecting arm connected to the end portion and a pole claw formed at a distal end of the connecting arm, the two pole claws defining a space for receiving a rotor, each pole claw having a pole arc surface each pole claw forming a long pole tip and a short pole tip, the long pole tip of each pole claw corresponding to the short pole tip of the other pole claw with a slot opening formed there between, and the pole surface being recessed inwardly to form at least one startup groove.

Preferably, the startup groove is located at a central axis of the pole claw.

Preferably, the startup groove is symmetrical with respect to the central axis of the pole claw and has a depth progressively increasing from two circumferential sides toward a center thereof.

Preferably, each of the long pole tip and the short pole tip has an end face inclined relative to the central axis of the pole claw with an angle.

Preferably, the end faces of the long pole tip and short pole tip of the same pole claw are located on a same plane.

Preferably, the end faces of the two pole claws are parallel to each other.

Preferably, a length of the long pole tip extending from the connecting arm is greater than a half of a width of a spacing between the connecting arms.

Preferably, each of the end portion and the arm portions is formed by stacking a plurality laminations and are mechanically interconnected, one of each arm portion and the end portion forms a locking groove, the other of each arm portion and the end portion forms a locking block, and each locking block is engaged in one corresponding locking groove to connect the arm portion and the end portion.

In a second aspect, the invention provides a stator core comprising: an end portion; and two spaced arm portions extending from the end portion, each arm portion comprising a connecting arm connected to the end portion and a pole claw formed at a distal end of the connecting arm, each pole claw forming a pole surface the two pole claws being spaced apart to form two slot openings, a line connecting the two slot openings being inclined with respect to a line connecting centers of the two pole surface, the pole surface having a startup groove located closer to a central axis of the pole claw than the slot opening.

Preferably, the startup groove is located at the central axis of the pole claw.

Preferably, the slot opening has a substantially uniform width along an axial direction.

Preferably, each of the two circumferential ends of the pole claw forms a pole tip, end faces of opposed pole tips of the two pole claws define one said slot opening there between, and the end faces are inclined with respect to the central line of the two pole claws.

In a third aspect, the present invention provides single phase permanent magnet motor comprising: a stator core; windings wound around arm portions of the stator core, and a permanent magnet rotor rotatably disposed in the stator core. The stator core comprises: an end portion; and two spaced arm portions extending from the end portion. Each arm portion includes a connecting arm connected to the end portion and a pole claw formed at a distal end of the connecting arm, the two pole claws defining a space for receiving a rotor, each pole claw having a pole surface, and having a long pole tip and a short pole tip, the long pole tip of each pole claw corresponding to the short pole tip of the other pole claw with a slot opening formed there between, and the pole surface being recessed inwardly to form at least one startup groove. An inner surfaces of the pole claws and the rotor forming an air gap there between.

DETAILED DESCRIPTION OF THE PREFERRED EMBODIMENTS

Figure 1:
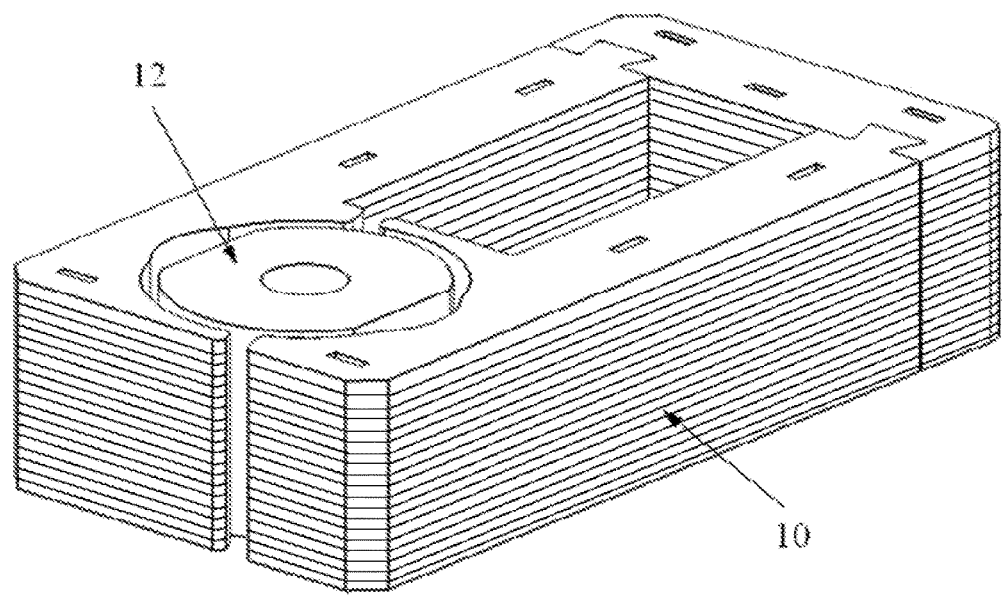
FIG. 1 illustrates a single phase permanent magnet motor according to one embodiment of the present invention.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

FIG. 1 illustrates a single phase permanent magnet motor according to one embodiment of the present invention. The motor includes a stator core 10, windings (not shown) wound around the stator core 10, and a permanent magnet rotor 12 rotatably disposed in the stator core 10. In the figures, for the sake of clearly showing the structure and features of the stator core 10 of the motor of the present invention, some parts of the motor, such as the windings, a control circuit for controlling the current of the windings, a motor housing or the like, are not shown, which can be constructed as in a known single phase permanent magnet motor. A rotary shaft may fixedly pass through the permanent magnet rotor 12 for connecting with a load. Upon the windings being energized, the stator core 10 is polarized which interacts with the magnetic field of the permanent magnet rotor 12 to push the permanent magnet rotor 12 to rotate, which in turn drives the load to operation.

Figure 2:
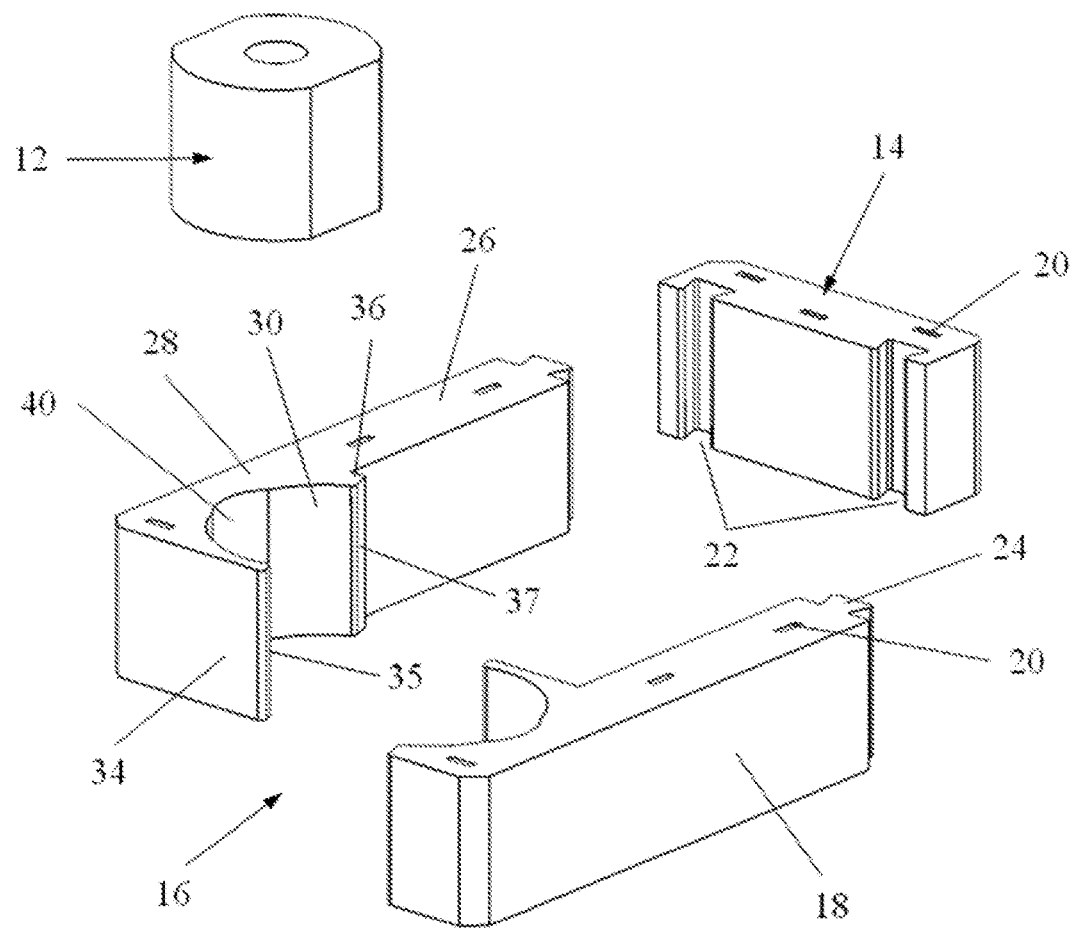
FIG. 2 is an exploded view of the motor of FIG. 1.

The stator core 10 may be made of a soft magnetic material such as ferrite. Preferably, as shown in FIG. 2, in the present embodiment, the stator core 10 is a U-shaped stator core including an end portion 14 and a pole arm 16 perpendicularly extending outwardly from the end portion 14. In this embodiment, the pole arm 16 includes two separate arm portions 18. The two arm portions 18 are spaced from and disposed in parallel with each other, and are both perpendicularly connected to the end portion 14. In this embodiment, the end portion 14 and the two arm portions 18 of the pole arm 16 are separately formed and then are connected together through mechanical connections. As such, the winding process can be completed before the arm portions 18 are connected to the end portion 14, which makes the winding process easier and more convenient. Preferably, each of the end portion 14 and the two arm portions 18 is made by stacking a plurality of core laminations such as silicon steel sheets. The figures only show the overall shapes of the end portion 14 and the arm portions 18 after the core laminations are stacked, without showing specific structures of the multiple stacked layers. For facilitating the assembly of the core laminations, each core lamination is formed with a corresponding assembly hole 20. In this embodiment, the assembly hole 22 is a recessed blind hole and the lamination has a protrusion corresponding to the blind hole. During stacking the laminations, the protrusion of one lamination is engaged in the assembly hole of an adjacent lamination so as to form a mechanical connection there between. The end portion 14 and the arm portions 18 are respectively formed by the methods.

In this embodiment, the end portion 14 forms two locking grooves 22 at locations adjacent two sides thereof. End faces of the two arm portions 18 toward the end portion 14 respectively form locking blocks 24. The locking blocks 24 of the two arm portions 18 are respectively inserted into the locking grooves 22 along the axial direction to connect the arm portions with the end portion 14, thus forming the stator core 10. Preferably, the locking block 24 is dovetail shaped and the locking groove 22 has a shape matching the locking block 24, so that the connection between the locking block 24 and the locking groove 22 is strengthened, to avoid disengagement there between. In another embodiment, the locking grooves 22 may be formed in the arm portions 18, the locking blocks 24 are correspondingly formed on the end portion 14, and the arm portions 18 and the end portion 14 likewise are connected together to form the stator core 10.

The two arm portions 18 of the pole arm 16 are opposed to each other and have substantially symmetrical construction. Each arm portion 18 is elongated, including a connecting arm 26 and a pole claw 28 formed at a distal end of the connecting arm 26. The connecting arms 26 of the two arm portions 18 are disposed in parallel with each other and are spaced apart by a spacing to allow for the winding of the windings. The two pole claws 28 are opposed to and spaced from each other. Opposed inner wall surfaces of the two pole claws 28 are recessed to form an arc pole surface 34. The arc pole surface 34 defines a receiving space 32 for receiving the rotor 12 therein. The receiving space 32 is generally in the form of an unclosed cylinder coaxial with the rotor 12. The receiving space 32 has a diameter slightly greater than a diameter of the rotor 12. As a result, the arc pole surface 30 is spaced from an outer surface of the rotor 12 with a small radial distance formed there between, thereby forming a generally even air gap for allowing the rotor 12 to rotate.

Figure 3:
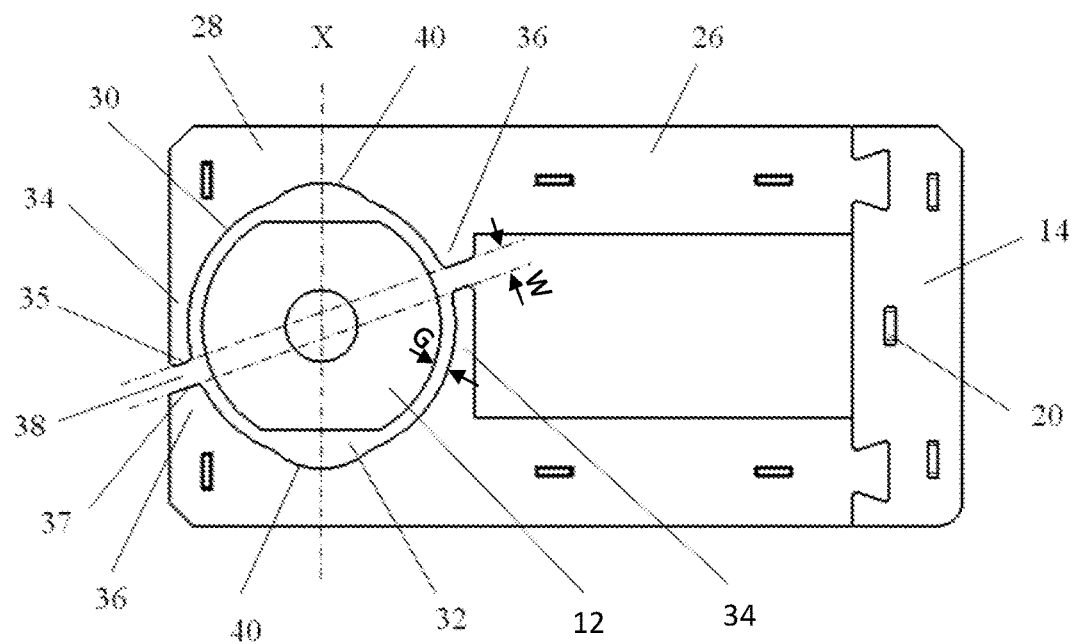
FIG. 3 is a top view of the motor of FIG. 1.

Referring also to FIG. 3, in this embodiment, each pole claw 28 is generally C-shaped, two circumferential sides of which project laterally outwardly relative to the connecting arm 26 towards the other pole claw 28 to form a long pole tip 34 and a short pole tip 36, respectively. A protrusion length of the long pole tip 34 relative to the connecting arm 26 is greater than a half of the width of the spacing between the connecting arms 26, while a protrusion length of the short pole tip 36 relative to the connecting arm 26 is far less than the width of the spacing between the connecting arms 26. Preferably, the short pole tip 36 of one pole claw 28 is located at an inner side, i.e. a side adjacent the end portion 14, and the long pole tip 36 of the one pole claw 28 is located at an outer side away from the end portion 14. On the contrary, the long pole tip 34 of the other pole claw 28 is located at the inner side, and the short pole tip 36 of the other pole claw 28 is located at the outer side.

After assembled, the short pole tip 36 of each pole claw 28 corresponds to the long pole tip 34 of the other pole claw 28. Preferably, a sum of the lengths of the short pole tip 36 and the long pole tip 34 protruding from the connecting arm 26 is slightly less than the width of the spacing between the connecting arms 26. After assembled, the corresponding long and short pole tips 34, 36 form a slot opening 38. This slot opening 38 causes the arc pole surface 30 being discontinued along the circumferential direction to avoid magnetic short-circuit. Preferably, the slot opening 38 has a substantially uniform width along the axial direction, and the two slot openings 38 formed between the two pole claws 28 have substantially the same width. Due to length difference between the long and short pole tips 34, 36, the locations of the slot openings 38 are offset from a middle of the spacing between the two connecting arms 26. Preferably, the width of the discontinuity in the arc pole surface 30 in the circumferential direction, i.e. the width W of the slot opening 36, is less than four times of the width G of an even portion of the air gap between the stator and the rotor. More preferably, the width of the slot opening 38 is less than two times of the width of the even portion of the air gap between the stator and the rotor, which reduces the cogging torque while reducing the magnetic leakage as much as possible, thereby ensuring the efficiency of the motor and reducing noise. Preferably, a line connecting the two slot openings 38 passes through a center of a rotary shaft of the rotor. Preferably, end faces 35, 37 of the long and short pole tips 34, 36 are inclined at an angle relative to a central axis X of the pole claws 28. Preferably, the end faces 35, 37 of the long and short pole tips 34, 36 of the same pole claw 28 are located on the same plane that is parallel to another plane on which the end faces 35, 37 of the long and short pole tips 34, 36 of the other pole claw 28 are located. As a result, center lines of the two slot openings 38 are coincident with each other, and the center lines are inclined relative to the central axis X of the pole claw 28, thus the pole claw is of an asymmetrical structure. This design can effectively reduce the inductance of the motor.

The arc pole surface 30 is recessed inwardly to form two startup grooves 40 located respectively on the two pole claws 28. Each startup groove 40 is located on the central axis X of the pole claws 28. The startup groove 40 is of an axis-symmetrical structure, having a central axis coincident with the central axis X of the pole claws 28. The startup groove 40 has a depth gradually increasing from two circumferential sides toward a center thereof. The maximum depth of the startup groove 40 is at a location corresponding to the central axis X. Because the arc pole surface 30 is inwardly recessed to form the startup grooves 40, the air gap between the stator core 10 and the rotor 12 at the areas of the startup grooves 40 is uneven, and the air gap has a greatest width at the location of the startup groove 40 corresponding to the central axis X of the pole claw 28.

In this embodiment, the pole claw 28 forms the long and short pole tips 34, 36 at the two sides thereof, and the end faces 35, 37 of the pole tips 34, 36 are inclined relative to the central axis X of the pole claw. This makes the center line of the arc pole surface 30 inclined with respect to the central axis X with an angle, which facilitates the startup of the rotor 12 and effectively reduces the inductance.

Although the invention is described with reference to one or more preferred embodiments, it should be appreciated by those skilled in the art that various modifications are possible. Therefore, the scope of the invention is to be determined by reference to the claims that follow.

The invention claimed is:

1. A stator core comprising:
an end portion; and
two spaced arm portions extending from the end portion, each arm portion comprising a connecting arm connected to the end portion and a pole claw formed at a distal end of the connecting arm, the two pole claws defining a space for receiving a rotor, each pole claw having a pole surface, and forming a long pole tip and a short pole tip, the long pole tip of each pole claw corresponding to the short pole tip of the other pole claw with a slot opening formed there between, and the pole surface being recessed inwardly to form at least one startup groove, outer surfaces of the long pole tips and the short pole tips being parallel with the end portion, a line connecting the two slot openings passing through a center of a rotor, and the line being not perpendicular to out surfaces of the long pole tips and the short pole tips.

2. The stator core of claim 1, wherein the startup groove is located at a central axis of the pole claw.

3. The stator core of claim 2, wherein the startup groove is symmetrical with respect to the central axis of the pole claw and has a depth progressively increasing from two circumferential sides toward a center thereof.

4. The stator core of claim 1, wherein each of the long pole tip and the short pole tip has an end face inclined relative to the central axis of the pole claw with an angle.

5. The stator core of claim 4, wherein the end faces of the long pole tip and short pole tip of the same pole claw are located on a same plane.

6. The stator core of claim 5, wherein the end faces of the two pole claws are parallel to each other.

7. The stator core of claim 1, wherein a length of the long pole tip extending from the connecting arm is greater than a half of a width of a spacing between the connecting arms.

8. The stator core of claim 7, wherein a sum of the length of the long pole tip extending from the connecting arm and a length of the short pole tip extending from the connecting arm is less than the distance between the two arm portions.

9. The stator core of claim 1, wherein each of the end portion and the arm portions is formed by stacking a plurality laminations and are mechanically interconnected, one of each arm portion and the end portion forms a locking groove, the other of each arm portion and the end portion forms a locking block, and each locking block is engaged in one corresponding locking groove to connect the arm portion and the end portion.

10. A single phase permanent magnet motor comprising:
a stator core according to claim 1:
windings wound around arm portions of the stator core, and
a permanent magnet rotor rotatably disposed in the stator core, the pole surface and the rotor forming an air gap there between.

11. The single phase permanent magnet motor of claim 10, wherein a width of the slot opening is less than four times of a width of an even portion of an air gap between the stator and the rotor.

12. The stator core of claim 1, wherein the two arm portions of the pole arm are opposed to each other and have substantially symmetrical construction.

13. A stator core comprising:
an end portion; and
two spaced arm portions extending from the end portion, each arm portion comprising a connecting arm connected to the end portion and a pole claw formed at a distal end of the connecting arm, each pole claw forming a pole surface, the two pole claws being spaced apart to form two slot openings, each of the two circumferential ends of the pole claw forms a long pole tip and a short pole tip, outer surfaces of the long pole tips and the short pole tips being parallel with the end portion, a line connecting the two slot openings being inclined with respect to a line connecting centers of the two pole surface, and not perpendicular to the out surfaces of the long pole tips and the short pole tips, the pole surface having a startup groove located closer to a central axis of the pole claw than the slot opening.

14. The stator core of claim 13, wherein the startup groove is located at the central axis of the pole claw.

15. The stator core of claim 14, wherein end faces of opposed pole tips of the two pole claws define one said slot opening there between, and the end faces are inclined with respect to the central line of the two pole claws.

16. The stator core of claim 13, wherein the slot opening has a substantially uniform width along an axial direction.

* * * * *